March 31, 1970 G. G. SCARROTT ET AL 3,504,342

SYSTEMS FOR SENSING AND RECOGNISING OR ANALYSING DATA

Filed Feb. 2, 1966 2 Sheets-Sheet 1

INVENTORS
GORDON GEORGE SCARROTT
ALAN DENNIS COOK
BY
Hane and Nydick
ATTORNEY

INVENTORS
GORDON GEORGE SCARROTT
ALAN DENNIS COOK
BY Home and Nydick
ATTORNEY

United States Patent Office 3,504,342
Patented Mar. 31, 1970

3,504,342

SYSTEMS FOR SENSING AND RECOGNISING OR ANALYSING DATA

Gordon George Scarrott, Wokingham, and Alan Dennis Cook, Steeple Morden, England, assignors to International Computers and Tabulators Limited, London, England, a British company Filed Feb. 2, 1966, Ser. No. 524,517
Claims priority, application Great Britain, Feb. 3, 1965, 4,588/65
Int. Cl. G06k 9/00
U.S. Cl. 340—146.3 7 Claims

ABSTRACT OF THE DISCLOSURE

A data sensing system in which a character on a record medium is scanned by a circular scan pattern with reflected light from the record medium analysed to provide an electrical indication of sensed data. As the centre of the circular scan pattern approaches the centre of a character line segment, first and second electrical signal components having one and two maxima, respectively, are produced. The ratio of the amplitudes of the first and second components is determined and is compared with a signal representative of the optical density at the centre of the character segment. Upon a determination that the centre-of-segment optical density lies between a predetermined range of values, and the ratio of amplitudes of the first and second signal components exceeds a defined value, an output signal is produced.

Figures 1, 2:
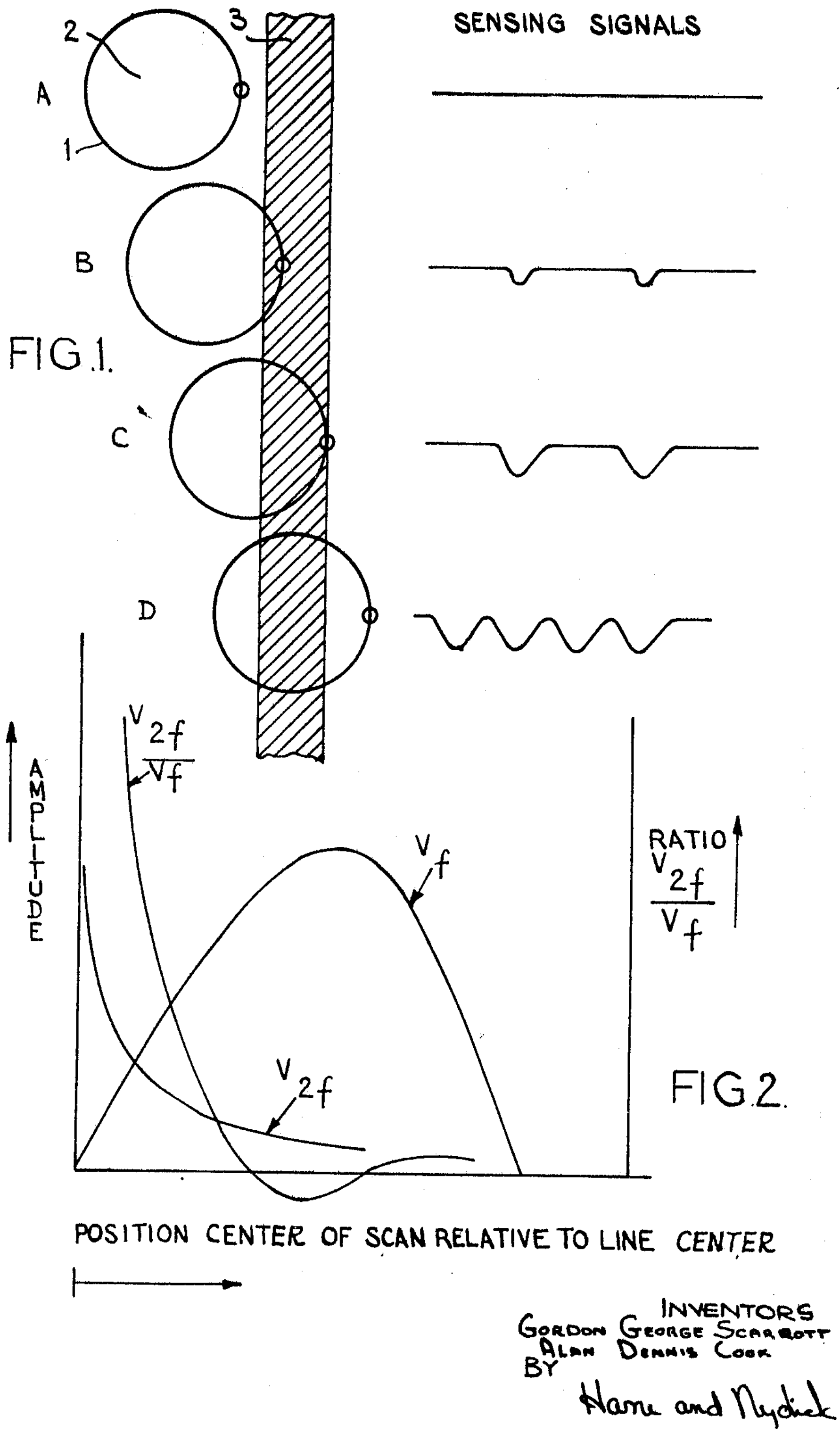

This invention relates to the sensing of data recorded as optically differentiated areas on a record medium in the form of lines and more particularly to the reading of characters printed on documents.

The lines which form the characters or other data are usually printed on the record medium using ink of a colour or shade which contrasts with the colour or shade of the record medium. The lines are sensed by illuminating the record medium and detecting the different amount of light reflected, or transmitted, by the lines and the record medium respectively using a photoelectric device. In one type of sensing apparatus, known as a flying spot scanner, only an elementary area of the record medium is illuminated at any instant by focussing the light spot on a cathode ray tube screen onto the document. The light spot is caused to traverse across the screen of the tube thereby illuminating successively a large number of elementary areas of the record medium. The light reflected from the record medium is received by a photomultiplier tube which generates electrical signals corresponding to the data sensed from the document. These signals are then passed to suitable circuitry which is arranged to analyse the signals and thereby recognise the characters printed on the document.

Ideally the lines forming the characters should be of constant width and all portions of the lines should be of the same shade or colour. However, in practice the width of the lines varies and the colour or shade of the line varies across its width, so that, in the case of a black line on a white document, the reflectance of the line is a minimum at the centre of its width and the reflectance increases towards the edges of the line. In consequence the edges of the line are not sharply defined and it becomes difficult to determine the configuration of the line.

This leads to a reduction in the reliability of the system and additional circuitry is required for recognition of the characters.

According to the invention, a method of sensing optically differentiated areas of a record medium consists in scanning each of a plurality of positions on said record medium, the scanning of a position being such as to produce a signal containing at least a first component with a first repetition rate if the optical density sensed by scanning that position has a single maximum and at least a second component at a second repetition rate which is a multiple of the first rate if the optical density sensed by scanning that position has two maxima; extracting said two components; determining the ratio of the amplitudes of the first and second components for each position; generating a signal indicative of the optical density at the centre of that position and generating an output signal only if both the ratio exceeds a defined value and the signal indicative of optical density at the centre of the position lies within a defined range of values.

Preferably the positions are scanned by a circular or elliptical scan.

Embodiments of the invention will now be described by way of example with reference to the accompanying drawings, in which, FIGURE 1 shows a circular scan in a number of positions relative to an ideal line of uniform optical density on the document and shows the corresponding output waveforms:

(a) scanning document background
(b) (c) including part of the width of a line on the document
(d) including the entire width of the line.

Figure 3:
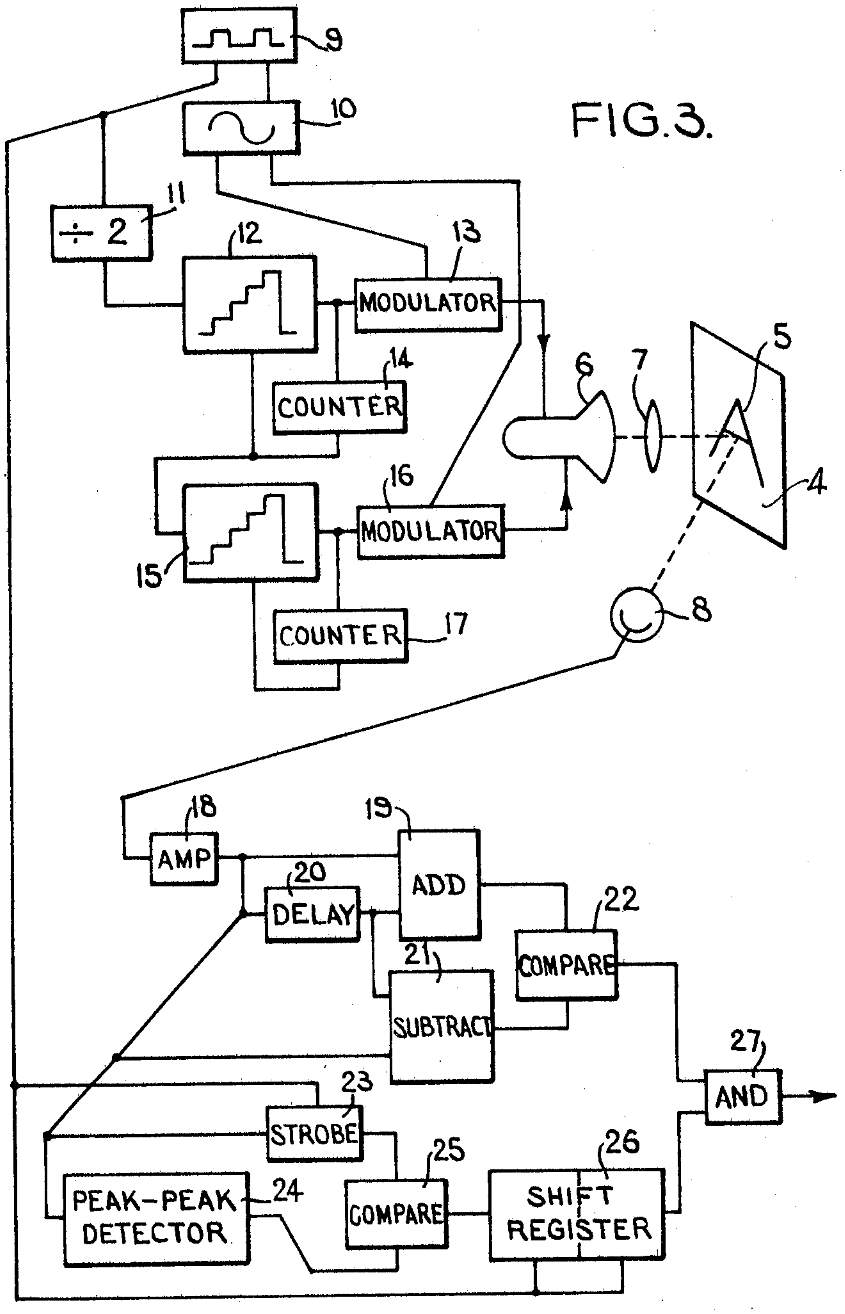

FIGURE 2 shows relative amplitudes of signals at frequency $f$ and $2f$ and the ratio between them, and FIGURE 3 is a block diagram of character reading apparatus embodying the invention.

Referring first to FIGURE 3, a document 4 carrying lines forming a character 5 is scanned by means of a spot of light on the screen of a cathode ray tube 6. The spot of light is focussed on to the document 4 by a lens 7 and light reflected from the document is received by a photo multiplier tube 8. For example, if the document is white and the lines are black, more light is reflected when the light falls on the background of the document than when the light falls on the black lines. The spot of light on the screen is made to describe a circle at a frequency $f$ so that a circle on the document is scanned, and in addition the circle is traversed across the screen of the tube so as to scan the entire area in which the character is located. The scanning signals for the cathode ray tube are derived from a square wave having a repetition rate $f$ and generated by generator 9. The square wave signal is applied to a circuit 10 which includes a filter tuned to pass signals of frequency $f$ and a phase delay circuit which produces a 90° phase lag. The output from the filter consists of a sine wave of frequency $f$ and this is passed through the phase delay circuit to provide a cosine wave of frequency $f$. The circuit 10 therefore has two outputs, one being the sine wave and the other the cosine wave, which are of equal amplitude. The square wave signal is also applied to a frequency divider circuit 11 to divide the frequency of waveform 9 by two with the output of circuit 11 applied to divide by two circuit 11 trigger a staircase waveform generator 12. The staircase waveform from generator 12 is applied to a modulator 13 where it is modulated by the sine wave from circuit 10. Since the generator 12 is triggered at half the repetition rate of the square wave, each step of the staircase waveform has superimposed thereon two cycles of the sine wave. The modulated waveform is applied to the vertical deflection circuits of the cathode ray tube 6. The output from generator 12 is also applied to a counter 14 which generates a reset signal after a predetermined count, and the reset signal is applied to the generator 12 to cause the staircase waveform to collapse resulting in the spot on the screen flying back to its starting point. The reset signal from counter 14 is also applied to a second staircase generator 15. The output of generator 15 is modulated in modulator 16 by the cosine wave output from circuit 10. This modulated staircase waveform is applied to the horizontal deflection circuits of the cathode ray tube. The output from generator 15 is applied to a counter 17 which generates a reset signal after a predetermined count, which signal is applied to generator 15 to cause the waveform to collapse.

Thus generator 12 causes the spot on the cathode ray tube to move vertically in a series of steps, the number of steps being determined by counter 14 and the generator 15 causes the path of the spot to be stepped horizontally. The sine wave and cosine wave signals superimposed on the staircase waveforms cause the spot to trace a circle twice for each step of vertical movement. The amplitude of the steps in the staircase waveforms is preferably equal to half the peak to peak amplitude of the sine wave so that the circle is stepped on by a distance equal to its radius. However, if desired the steps may be smaller than the radius of the circle, the radius being an integral multiple of the step distance.

If desired the horizontal stepping deflection of the cathode ray spot may be omitted, in which case the horizontal stepping of the cricle relative to the document is accomplished by moving the document horizontally during the reading operation.

Referring now to FIGURE 1 the spot of light on the screen of the cathode ray tube in describing a circle is focused onto the document and therefore describes a circle 1 at a frequency $f$ on the document so that at the position being scanned a circular area 2 of the document is scanned. The diamater of the circular area on the document is chosen to be slightly greater than the maximum width of the lines 3 on the document. Thus as the spot of light moves around the periphery of the circular area the electrical signal generated by the photo multiplier 8 will be either constant at one level if there is no line extending across the area being scanned (FIGURES 1 (*a*) ) or will change to another level, if the line 3 extends across the area, as the spot of light passes over the line FIGURE 1 (*b*) (*c*) (*d*). If the area being scanned includes only a part of the width of the line 3, FIGURE 1 (*b*), (*c*), it will be seen that during one circular scan the spot of light passes once over a white document portion and once over the black line 3. However, if the area being scanned includes the entire width of the line 2, and extends beyond both edges of the line, FIGURE 1 (*d*), in a single circular scan the spot of light passes twice over white portions and twice over black portions. The waveforms of FIGURE 1 show the signals obtained during two circular scans.

Thus it will be seen that if the line is only partially overlapped by the scan, the electrical signal from the photomultiplier 9 contains a component at a frequency $f$ whereas if the line width lies within the scan, so that the scan extends beyond both edges of the line, the electrical signal from the photomultiplier contains a component at a frequency $2f$.

Referring back to FIGURE 3 the electrical signals from the photomultipler are amplified by amplifier 18 and applied both directly and through a delay network 20 to a first circuit 19 which is arranged to produce the sum of the direct and delayed signals and to a second circuit 21, which is arranged to produce the difference of the direct and delayed signals. The delay network 20 delays the signals by half the period of the scan, i.e. $\frac{1}{2}f$ secs., so that any component having a frequency $f$ in the electrical signals from the photomultplier 8, is delayed by half cycle whereas any component having a frequency $2f$ is delayed by a whole cycle. By employing two well known trignometric identities, it will be noted that adder 19 produces an output having a double frequency component while subtractor 21 produces an output having only a single frequency component. If the single frequency component at the output of amplifier 18 is represented as $A \cos wt$, upon a delay of half a cycle an output from delay means 20 of $A \cos (wt+\pi)$ is obtained. These components are added together by adder 19 as are the double freqeuncy components $B \cos 2wt$ and $B \cos (2wt+2\pi)$. As stated previously, the double frequency component is delayed by a full cycle, or $2\pi$, by delay means 20.

Since, $\cos x+\cos y=2 \cos \frac{1}{2} (x+y) \cos \frac{1}{2} (x-y)$, and, if constants A and B represent the amplitudes of the single and double frequency components, respectively, it follows that $$A \cos wt.+A \cos (wt+\pi)=$$
$$2A^2 \cos {}^1/_2\ wt+wt+\pi) \cos {}^1/_2\ (wt-wt-\pi)=$$
$$2A^2 \cos (wt+\frac{\pi}{2}) \cos \frac{\pi}{2};\ \text{since} \cos-\frac{\pi}{2}=0$$

the single frequency component of the output of adder 19 is zero.

Now, considering the double frequency component $B \cos 2wt$, it follows that $$B \cos 2wt+B \cos (2wt+2\pi)=2B^2 \cos \tfrac{1}{2} (2wt+2wt+2\pi) \cos \tfrac{1}{2} (2wt-2wt-2\pi)=2B^2 \cos (2wt+\pi) \cos-\pi$$

since $\cos -\pi=-1$, the output of adder 19 is represented by a double frequency function. Similarly, by considering the trignometric identity, $$\cos x-\cos y=2 \sin \tfrac{1}{2} (x+y) \sin \tfrac{1}{2} (x-y)$$

it will be seen that the output of subtracting circuit 21 is comprised only of a single frequency component. Thus, the sum output of the adding circuit 19, is proportional to the ampliture $V_{2f}$ of the component having a frequency $2f$ and the difference output from the subtract circuit 21, is proportional to the amplitude $V_f$ of the component having a frequency $f$.

Adding and subtracting circuits 19 and 21, respectively, are well known in the art and may be of the type shown in U.S. Patent No. 3,213,282.

If the cricular scan is positioned so that there is no line within its area then there is no output from either the first circuit 19 or the second circuit 21. If the area of scanning is moved so as to intercept a line on the document, as the centre of the area approaches the centre of the line the amplitude of the difference output from the second circuit 21, which is proportional to the amplitude $V_f$ of the component at the frequency $f$, increases until the scan is in the position shown in FIGURE 1 (*c*). On further movement the difference output decreases as shown in FIGURE 2. Also, as the scan moves toward the position shown in FIGURES 1 (*d*) the amplitude of the sum output signals from the first circuit, which is proportional to the amplitude $V_{2f}$ of the component at frequency $2f$ increases to a maximum when the centre of the scan is coincident with the centre of the line (see FIGURE 2). The ratio of the amplitude $V_{2f}$ to the amplitude $V_f$ is also shown in FIGURE 2 from which it is apparent that the ratio is asymptotic to the left vertical axis of the figure when the centre of the scan coincides with the centre of the line.

The sum and difference output signals from the adding circuit 19 and subtract circuit 21 respectively are passed to a compare circuit which generates a signal representing the value of the ratio $V_{2f}/V_f$ which generates an output signal when this ratio exceeds a predetermined value.

The output signal generated by the compare circuit 22 when the ratio $V_{2f}/V_f$ exceeds a predetermined value, indicates that the scan area is centered on a line on the document. However, the system described so far is not sensitive to absolute colour or shade and is sensitive only to contract between a line and the document. Thus the output signal would be generated both for a black line on a white document and for a white line on a black document. Consequently if two lines are spaced apart by a distance approximately equal to the width of the lines, an output signal will be generated when the scan is centered on the space between the lines. For example, if the letter E is being sensed, an output signal would be generated not only for each of the three horizontal strokes but also may be generated for the two horizontal spaces between the strokes. Therefore when utilising the invention in apparatus for character recognition it is necessary to determine whether the circle is centered on a line or a space between lines.

In order to determine whether the center of a circular area being scanned on the document is black or white, the output from amplifier 18 is strobed at the time that the centre of the area is sensed by a preceding circular scan. For this purpose the output from amplifier 18 is applied to a strobe gate 23 which is opened at the required portion of the circular scan by a signal derived from generator 9. The amplifier output is also applied to a peak to peak detector 24 which gives an output proportional to the difference between the amplitudes of signals due to the most black and most white areas sensed during the circular scan. The outputs of the detector 24 and strobe gate 23 are applied to a compare circuit 25 which generates an output signal if the strobed signal indicates a sufficiently black area relative to the blackest area sensed during the scan, i.e. circuit 25 generates an output signal if the ratio of strobed signal to peak to peak signal exceeds a predetermined value. The output from circuit 25 is applied to the input stage of a two stage shifting register 26. The signals stored by the register 26 are shifted by shift signals derived from generator 9. Comparators 22 and 25 may be of the type shown in U.S. Patent No. 3,085,227 while peak detector 24 may be of the type disclosed in FIG. 5 of U.S. Patent No. 3,209,348.

Considering the scanning of two circular areas in successive steps of the scan, each area is scanned twice and in each scanning of the first area, if the centre of the second area is sufficiently black, the compare circuit 25 generates an output signal which is applied to the first stage of the shifting register 26, the signal applied during the first scan being shifted to the second stage during the second scan of the first area. The circular scan is now stepped on by a distance equal to the radius of the circle to scan the second area. During the first scan of the second area, if the second area is centred on a black line, an output is obtained from compare circuit 25 and the contents of shift register 26 are stepped on so that an output signal is obtained from the second stage of the shift register 26. The signals from the compare circuit 22 and the register 26 are passed to an AND gate 27 which provide a signal which is passed to logical circuitry, not shown, for recognition of the character being sensed. Similarly the second scanning of second area results in a signal from gate 27. Thus a signal is obtained from gate 27 only if the circular area being scanned is centred on a line and the line is of the required shade or colour. It is to be understood that the time for which the signals are required to be stored in the shift register is dependent on the number of circular scans at each area and the number of steps of the scan which are necessary to shift the circular scan by a distance equal to its radius. Thus if the step is equal to half the radius and each area is scanned twice, then four stages would be provided with the register 26.

The method of sensing the document has been described in relation to ideal lines of uniform optical density on a uniform document background. However, in practice the lines usually have variations in optical density which for example may be least at the indeterminate edges of the line and increase to a maximum somewhere within the line. Thus when the circular scan partially intersects the line, and does not pass beyond the region of maximum density the electrical signal contains a component at frequency $f$. However, when the scan does pass beyond the region of maximum density, although it does not extend beyond both edges of the lines, the maximum is sensed twice in a cycle so that the scanning senses two optical maxima and the electrical signals contains a component at frequency $2f$.

When the scan is aligned with a junction of two or more lines, the electrical signals from the photomultiplier include components at high multiples of the scan frequency.

Instead of causing the circular scan to traverse in a predetermined manner, the scan may be caused to follow along a line by utilising the output signal, obtained when the ratio $V_{2f}/V_f$ exceeds a predetermined value, to control the displacement of the scan in such a manner that the scan follows along the line.

Whilst the invention has been described in relation to a circular scan, it should be understood that other closed loop repetitive scans, such as a rectangular scan, may be used.

Whereas in the above described apparatus, the spot on the cathode ray tube is caused to describe a circular scan twice at each position, the spot may be caused to describe the circular scan any desired number of times. If a sufficient number of scans are made of each position, the two components of frequency $f$ and $2f$ may be extracted by means of filter networks which pass these frequencies respectively.

What is claimed is:

1. Apparatus for sensing optically differentiated areas of a record medium including means for scanning each of a plurality of positions on said record medium, the scanning of a position being such as to produce a sensing signal containing at least a first component having a first repetition rate if the optical density sensed by scanning that position has a single maximum and at least a second component having a second repetition rate which is a multiple of the first rate if the optical density sensed by scanning that position has two maxima; means operative to extract said first and second components; means operative in response to the extracted components to generate a first signal indicative of the ratio of the amplitudes of the first and second components for each position; means operative to generate a second signal indicative of the optical density at the centre of that position; and means responsive to said first and second signals to generate an output signal only if both said first signal exceeds a defined value and said second signal lies within a defined range of values.

2. Apparatus as claimed in claim 1, in which the scanning means is operative to sense the optical density at the periphery of each position.

3. Apparatus as claimed in claim 1 in which the scanning means is operative to sense the optical density at the periphery of a first position and the optical density at the periphery of a second position, the location of the second position relative to the first position being such that the periphery of the first position passes through the centre of the second position; and including strobe means operative to select the sensing signals produced during the sensing of the first position due to the optical density at the centre of the second position.

4. Apparatus as claimed in claim 2 in which the scanning means is operative to sense the optical density at the periphery of a circular area at each position.

5. Apparatus as claimed in claim 2 including a cathode ray tube operative to generate a spot of light for illuminating a corresponding spot on the record medium and first deflection means operative to cause the spot of light to describe a circle at each position.

6. Apparatus as claim in claim 5, including second deflection means operative to displace the circle in discrete steps by a distance equal to the radius of the circle.

7. Apparatus as claimed in claim 1, in which said means for extracting said first and second components includes a delay circuit operative in response to the sensing signals to delay said sensing signals by a time interval equal to half the period of a circular scan cycle; an adding circuit responsive to said sensing signals and said delayed sensing signals to extract said second component; and a subtraction circuit responsive to said sensing signals and said delayed sensing signals to extract said first component.

References Cited

UNITED STATES PATENTS 2,213,421 10/1965 Abraham ---------- 340—146.3

THOMAS R. ROBINSON, Primary Examiner

U.S. Cl. X.R.

235—92